Patented Jan. 12, 1926.

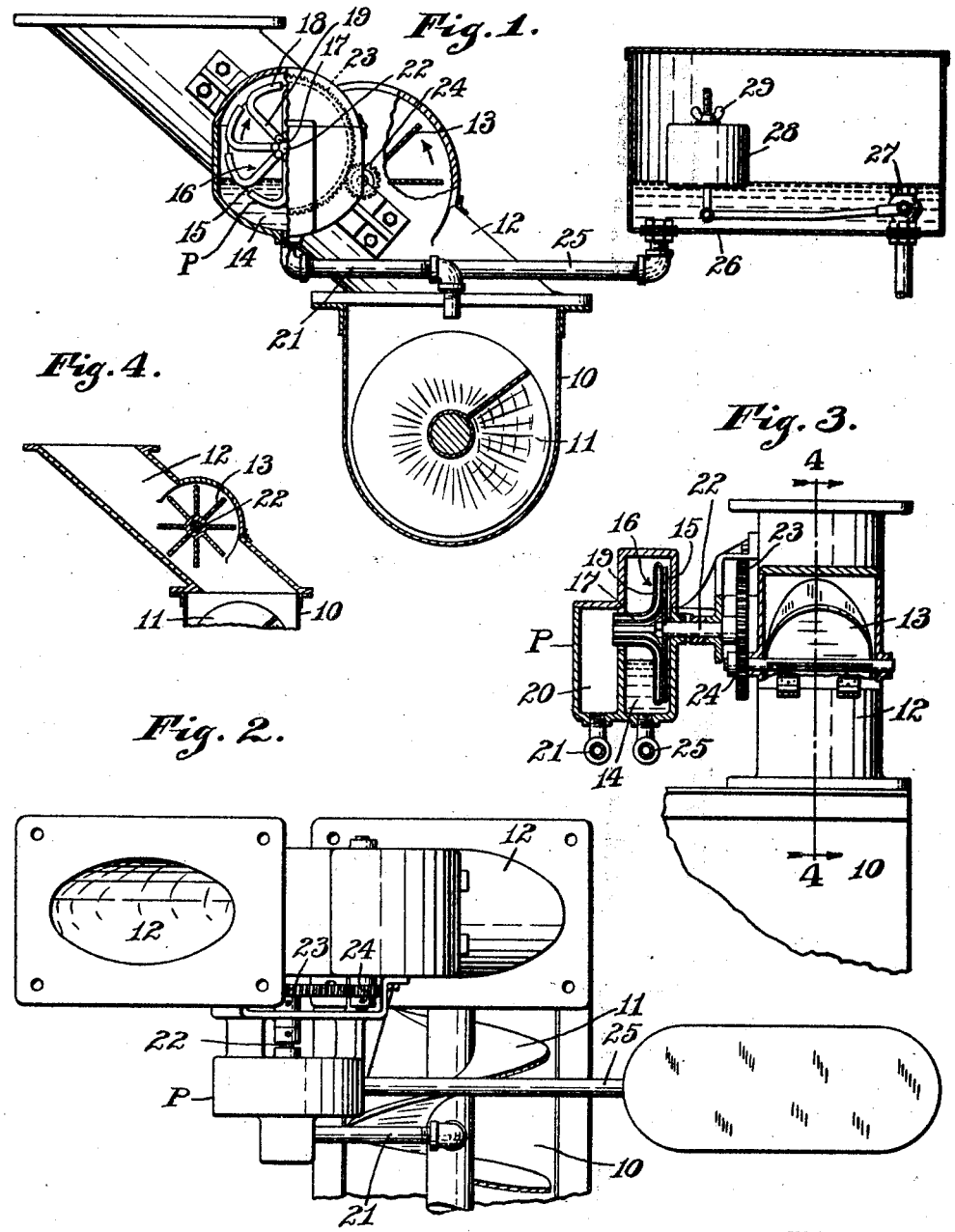

1,569,201

UNITED STATES PATENT OFFICE.

SCEBRON M. PIERSALL, OF ABILENE, KANSAS.

GRAIN CONDITIONER.

Application filed July 14, 1924. Serial No. 725,798.

*To all whom it may concern:*

Be it known that I, SCEBRON M. PIERSALL, a citizen of the United States, residing at Abilene, in the county of Dickinson and State of Kansas, have invented a new and useful Grain Conditioner, of which the following is a specification.

The object of my invention is to produce an efficient, simple mechanism by which there may be delivered to a flowing stream of wheat, measured quantities of water, sufficient to properly condition the wheat, the quantity of water being automatically varied in accordance with the initial condition of the wheat and rate of flow.

The accompanying drawings illustrate my invention. Fig. 1 is an end elevation, in partial vertical sections in several planes, of an apparatus embodying my invention; Fig. 2 a plan; Fig. 3 a vertical section in planes at right angles to the plane of Fig. 1, and Fig. 4 a vertical section, on a smaller scale on the line 4 4 of Fig. 3.

In the drawings 10 indicates a suitable delivery trough or chute in which there is mounted a suitable discharging conveyer, such for instance as an ordinary screw conveyer 11.

Leading into trough 10 is a downwardly inclined feed chute 12, the angle of inclination of which is slightly greater than the angle of rest of the wheat (or other grain to be conditioned) in its most moist normal condition, said feed chute 12 leading from any suitable source of grain supply.

Mounted in chute 12 is a paddle wheel 13, the paddles of which project into trough 12 close to the bottom and sides thereof so as to be affected by the grain flowing by gravity through said trough.

Mounted along side of trough 12 is a pump P driven by paddle wheel 13. This pump may, of course, be of any desired form, but I prefer the particular construction shown, comprising chamber 14 and rotor 15, said rotor comprising a plurality of circumferentially arranged tubes 16, each having an axial arm 17, a circumferential arm 18 and an intermediate radial arm 19, the arrangement being such that when rotor 15 is rotated in the proper direction the circumferential arms 18 will enter a body of water in chamber 14 and extract therefrom a measured quantity of water which is delivered through arms 19 and 17 into a discharge chamber 20 which delivers, through pipe 21, to chute 10.

Rotor 15 is carried by shaft 22 connected by gears 23 and 24 with paddle wheel 13.

Chamber 14 is connected, by pipe 25 with a supply reservoir 26 in which a constant head of water is maintained by means of valve 27 and its controlling float 28 adjustable by means of adjusting nut 29.

The quantity of water delivered to the grain reaching spout 10 is determined by the adjustment of float valve 27 and the constream of grain flowing through chute 12, chamber 14, the speed of movement of the rotor 15, and the consequent delivery of water, being determined by the rate of flow of grain through chute 12 past paddle wheel 13.

The speed of paddle wheel 13 will depend upon two conditions. First, the deeper the stream of grain flowing through chute 12, the more rapid will be the movement of paddle wheel 13 because the gravity flow of the grain through chute 12 is substantially the same irrespective of the depth of the stream and therefore, the deeper will be the contact of the grain with the paddle wheel and consequently the faster will be the rotation of the paddle wheel. Second, the gravity flow of grain through chute 12 will vary inversely as the dampness of the grain, dry grain flowing more rapidly than moist grain because the angle of rest of moist grain is greater than the angle of rest of dry grain.

It will be apparent, therefore, that there will be an automatic variation of water delivered to the grain, depending upon the quantity rate of flow and the initial moisture condition.

I claim as my invention:

1. A grain conditioner comprising a chute inclined both to the vertical and horizontal, a paddle wheel arranged in said chute so that its paddles will project radially into the depth of a stream flowing through said chute, a water pump driven by said paddle wheel, and a delivery pipe leading from said pump to the discharge stream line of the chute.

2. A grain conditioner comprising a chute inclined both to the vertical and horizontal, a paddle wheel arranged in said chute so that its paddles will project radially into the depth of a stream flowing through said chute, a water pump driven by said paddle wheel, means for maintaining a constant level supply of water for said pump, and a delivery pipe leading from said pump to the discharge stream line of the chute.

3. A grain conditioner comprising a chute inclined both to the vertical and horizontal, a discharge chute leading laterally from said inclined chute, a pump chamber, a pump rotor mounted in said pump chamber and comprising a plurality of tubes each having an axial, radial and circumferential arm, a pump discharge line arranged to receive liquid from the axial arms of said tubes and discharge the same into the lateral chute, a paddle wheel mounted in the downwardly inclined chute and arranged to project its paddles radially into the depth of a grain stream flowing through said inclined chute, and connections between the paddle wheel and pump rotor.

4. A grain conditioner comprising a chute inclined both to the vertical and horizontal, a discharge chute leading laterally from said inclined chute, a pump chamber, a pump rotor mounted in said pump chamber and comprising a plurality of tubes each having an axial, radial and circumferential arm, a pump discharge line arranged to receive liquid from the axial arms of said tubes and discharge the same into the lateral chute, a paddle wheel mounted in the downwardly inclined chute and arranged to project its paddles radially into the depth of a grain stream flowing through said inclined chute, means for maintaining a constant water level in the pump chamber, and connections between the paddle wheel and pump rotor.

5. A grain conditioner comprising a chute inclined both to the vertical and horizontal, a paddle wheel arranged in said chute so that its paddles will project radially into the depth of a stream flowing through said chute, a pump chamber, a pump rotor mounted in said pump chamber and comprising a plurality of tubes each having an axial, radial and circumferential arm, a pump discharge line arranged to receive liquid from the axial arms of said tubes and discharge the same into the discharge flow line from the inclined chute, and connections between the paddle wheel and pump rotor.

6. A grain conditioner comprising a chute inclined both to the vertical and horizontal, a paddle wheel arranged in said chute so that its paddles will project radially into the depth of a stream flowing through said chute, a pump chamber, a pump rotor mounted in said pump chamber and comprising a plurality of tubes each having an axial, radial and circumferential arm, a pump discharge line arranged to receive liquid from the axial arms of said tubes and discharge the same into the discharge flow line from the inclined chute, means for maintaining a constant water level in the pump chamber, and connections between the paddle wheel and pump rotor.

In witness whereof, I, SCEBRON M. PIERSALL, have hereunto set my hand at Abilene, Kansas, this 27th day of June, A. D. one thousand nine hundred and twenty-four.

SCEBRON M. PIERSALL.